No. 658,415. Patented Sept. 25, 1900.
A. G. WRIGHT.
ATTACHMENT FOR AUTOMATIC CIRCULAR KNITTING MACHINES.
(Application filed Dec. 12, 1899.)

(No Model.) 4 Sheets—Sheet 1.

Witnesses:
Thomas M. Smith
Richard L. Maxwell

Inventor:
Alfred G. Wright
By J. Walter Douglass
Attorney

No. 658,415. Patented Sept. 25, 1900.
A. G. WRIGHT.
ATTACHMENT FOR AUTOMATIC CIRCULAR KNITTING MACHINES.
(Application filed Dec. 12, 1899.)
(No Model.) 4 Sheets—Sheet 2.
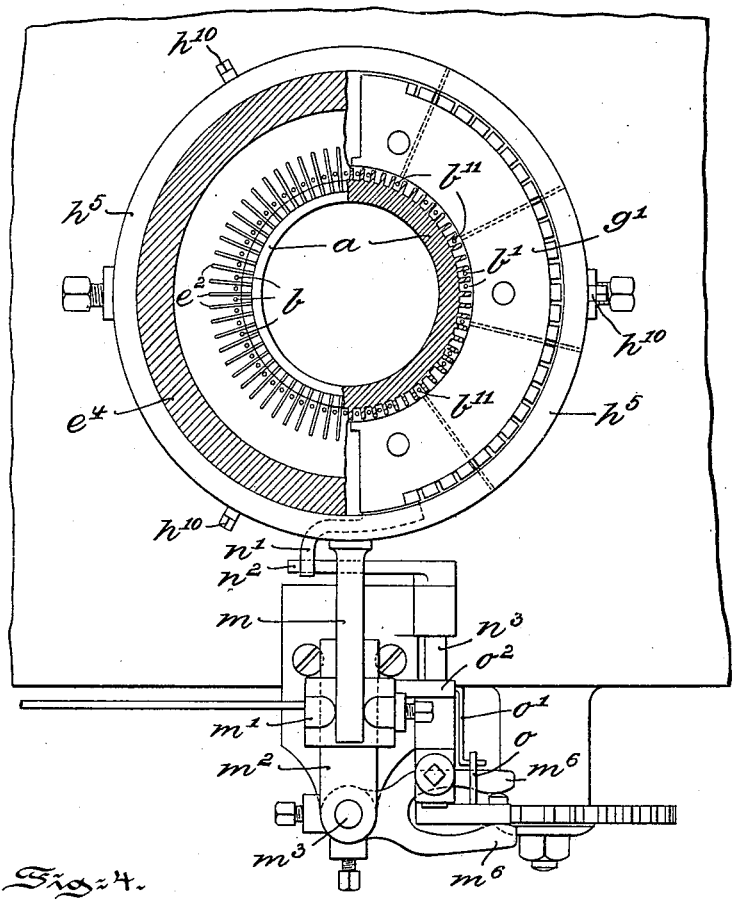
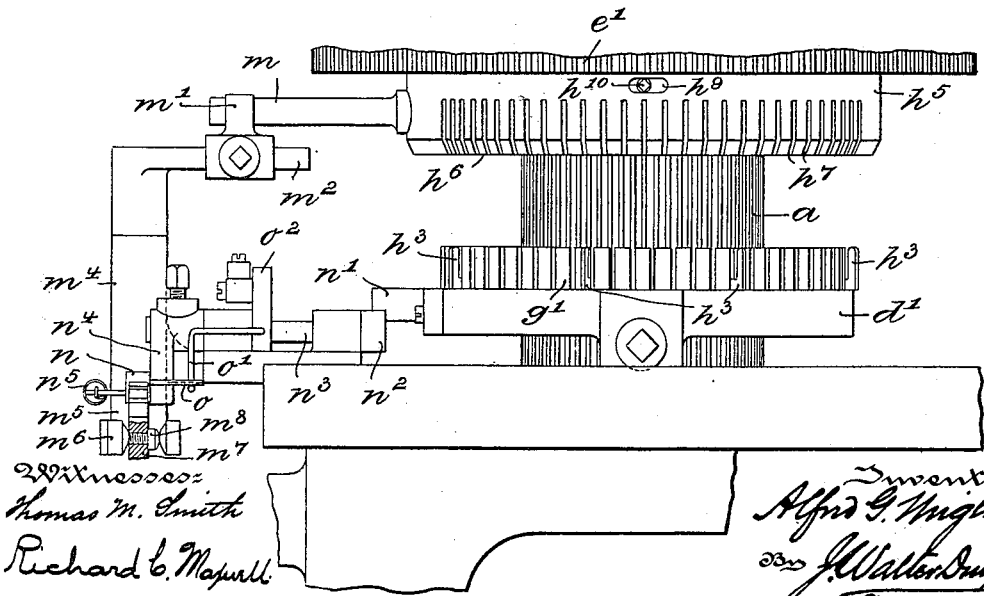

No. 658,415. Patented Sept. 25, 1900.
A. G. WRIGHT.
ATTACHMENT FOR AUTOMATIC CIRCULAR KNITTING MACHINES.
(Application filed Dec. 12, 1899.)
(No Model.) 4 Sheets—Sheet 3.
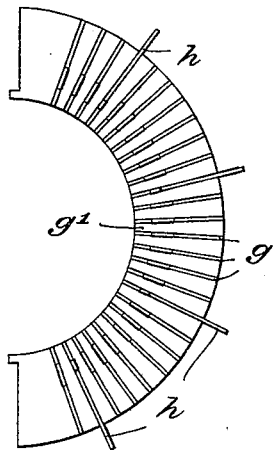
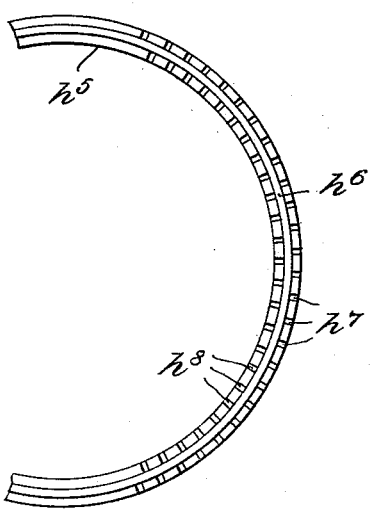
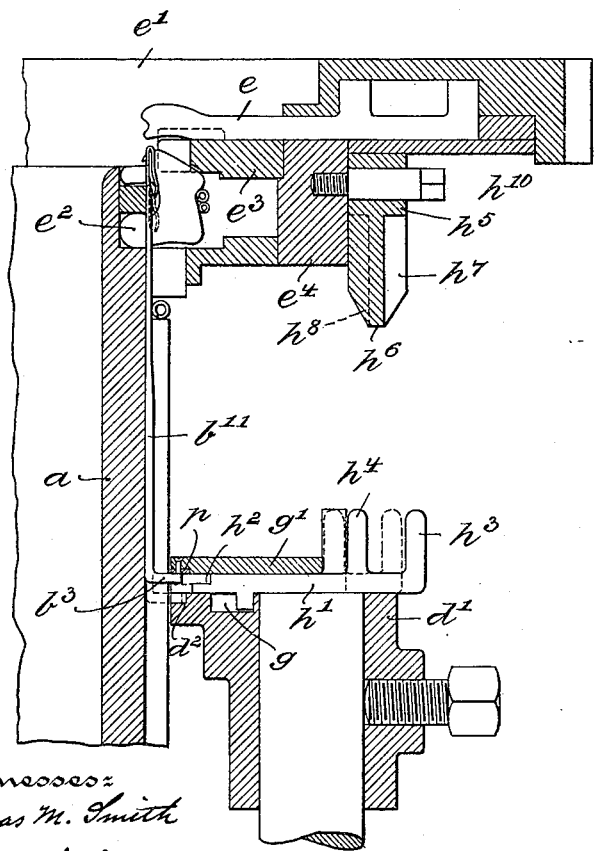
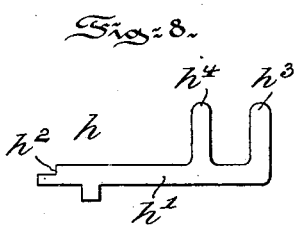
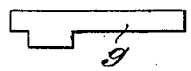
Witnesses:
Thomas M. Smith
Richard C. Maxwell
Inventor:
Alfred G. Wright
By J. Walter Douglas
Attorney

UNITED STATES PATENT OFFICE.

ALFRED G. WRIGHT, OF PHILADELPHIA, PENNSYLVANIA, ASSIGNOR TO THE NATIONAL AUTOMATIC KNITTER COMPANY, OF SAME PLACE.

ATTACHMENT FOR AUTOMATIC CIRCULAR-KNITTING MACHINES.

SPECIFICATION forming part of Letters Patent No. 658,415, dated September 25, 1900.

Application filed December 12, 1899. Serial No. 740,063. (No model.)

*To all whom it may concern:*

Be it known that I, ALFRED G. WRIGHT, a citizen of the United States, residing at the city of Philadelphia, in the county of Philadelphia and State of Pennsylvania, have invented certain new and useful Improvements in Attachments for Automatic Circular-Knitting Machines, of which the following is a specification.

My invention has relation to a knitting-machine of the type or class known as a "circular-knitting" machine such as is illustrated in the Letters Patent of the United States No. 536,616, granted to E. J. Franck under date of April 2, 1895, and in such connection it relates more particularly to the construction and arrangement of the mechanism, comprising an attachment whereby open or lace work may be knit in conjunction with the regularly-formed meshes usually knit upon the machine.

The principal object of my invention is to provide a circular-knitting machine with two needle-carriers, one of said carriers receiving and guiding the fashioning-needles and the other carrier receiving and guiding the ordinary needles, and an attachment whereby the ordinary needles are adapted to knit open or lace work during fabrication of the article to be knit.

My invention, stated in general terms, consists of an attachment for automatic circular-knitting machines constructed and arranged in substantially the manner hereinafter described and claimed.

The nature and scope of my invention will be more fully understood from the following description, taken in connection with the accompanying drawings, forming part hereof, in which—

Figure 1:
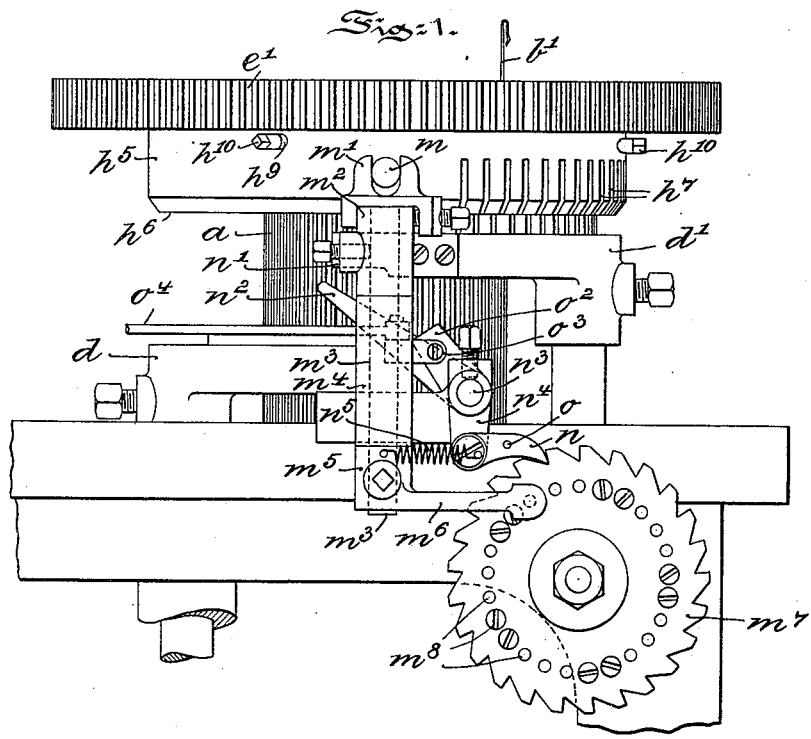
Figure 2:
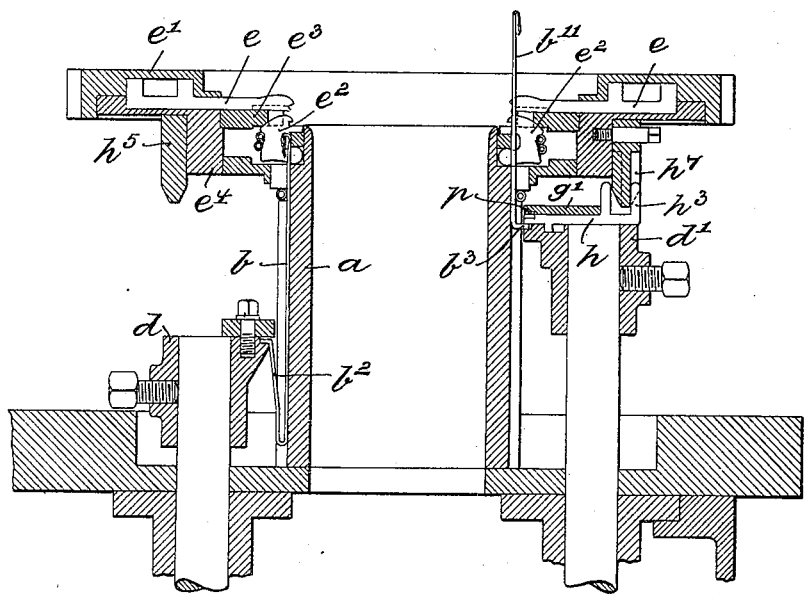
Figure 10:
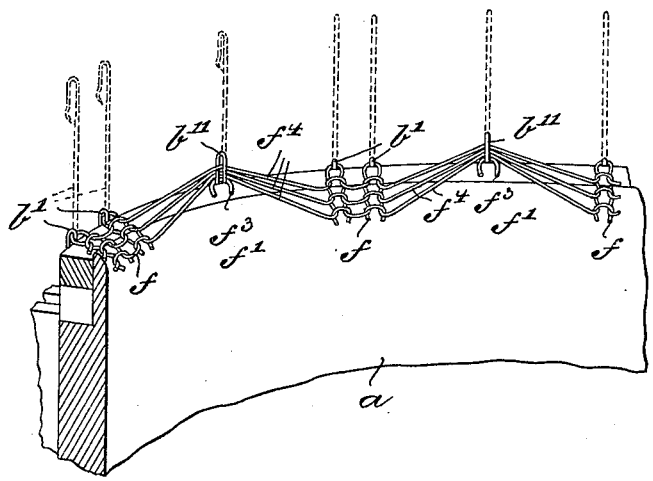
Figure 11:
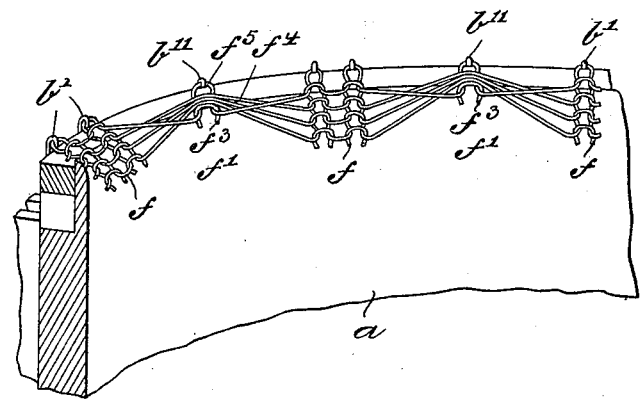
Figure 12:
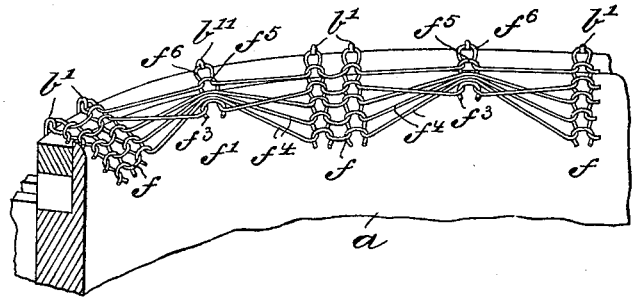

Figure 1 is a front elevational view of the upper portion of a circular-knitting machine, the attachment therefor embodying my invention being connected therewith. Fig. 2 is a vertical central sectional view of Fig. 1. Fig. 3 is a top or plan view of Fig. 1, certain parts being sectioned or broken away to more clearly illustrate the construction of the attachment. Fig. 4 is a side elevational view of Fig. 1 looking toward the right-hand side of the machine, with the needle-carrier in a depressed position. Fig. 5 is an enlarged vertical sectional view illustrating in detail the right-hand side of Fig. 2, the needle-carrier, however, being depressed. Fig. 6 is an underneath plan view, enlarged, of the plate secured to the needle-carrier in which the jacks are adapted to slide. Fig. 7 is a similar view of the concentric and slitted ring for operating the jacks which momentarily regulate the movement of certain of the regular needles in the carrier. Fig. 8 is a side elevational view, enlarged, of one of the jacks for regulating the movement of said needles. Fig. 9 is a similar view of a jack which always locks a needle to the carrier; and Figs. 10, 11, and 12 are perspective views illustrating, diagrammatically, certain steps in the formation of the open-work meshes.

Referring to the drawings, it will be seen that the main portions of the machine are arranged and operate in substantially the manner illustrated and described in Letters Patent No. 536,616, hereinabove referred to—that is to say, the needle-cylinder $a$ is provided on its periphery with longitudinally-arranged grooves, in which are adapted to reciprocate two distinct sets of needles, one set $b$ occupying the grooves of one-half the periphery of the cylinder and being the fashioning-needles, whereas the other set $b'$ are arranged in the remaining grooves and are the regular needles. As explained in the prior patent, the fashioning-needles have at their lower ends the springs $b^2$, which normally lock the needles to their carrier $d$, while the other needles $b'$ have bits or projections $b^3$, by means of which they are normally locked to their carrier $d'$. The sinker-bars $e$, sinker-bar bed $e'$, web-holders $e^2$, and beard-closing ring $e^3$ are likewise of the same general type as illustrated and described in said patent and operate in substantially the same manner, and detailed description thereof in the present specification is therefore not deemed necessary.

The present improvement resides in the means for controlling the movement of certain of the regular needles $b'$, so that those needles at predetermined intervals will not be carried downward by the carrier $d'$ to permit, in conjunction with the beard-closing ring $e^3$, the casting off of loops from said needles. In carrying out my invention the needles $b'$ are arranged in the cylinder $a$ according to the pattern of lacework desired. In the instance illustrated in the drawings the needles $b'$ are arranged as follows: Two needles are inserted in the grooves of the cylinder $a$, then two grooves are left vacant, then a single needle $b^{11}$ is inserted in the next groove, and then after leaving the next two grooves unoccupied the following two grooves are filled with the needles $b'$, and so on around the semiperiphery of the needle-cylinder. With respect to the needles $b'$, arranged in groups of two, it may be remarked that these needles always, when in operation, knit the regular meshes $f$, as illustrated in Figs. 10, 11, and 12. They are normally locked to their carrier $d'$ by a removable jack $g$ (see Figs. 6 and 9) and have no vertical movement with respect to the carrier. The carrier $d'$ carries at its upper face a semicircular plate $g'$, the under face of which is radially slotted for the reception of the removable jacks $g$, which normally lock the needles $b'$ to the carrier $d'$, and the other jacks $h$, which serve, as hereinafter described, to lock or release the needles $b^{11}$ in the carrier $d'$. The jacks $h$ are illustrated in detail in Figs. 2, 5, and 8 and consist of a horizontal flat strip $h'$, having the inner end cut out, as at $h^2$, and fit upon the bits $b^3$ of the needles $b^{11}$. The strip $h'$ is also provided at its other end with two upwardly-projecting prongs $h^3$ and $h^4$. The jack $h$ is adapted to slide horizontally in the jack-plate $g'$, and when pushed inward, as illustrated in Fig. 2, will lock the needle $b^{11}$ to the carrier; but when pushed outward, as illustrated in Fig. 5, it will be withdrawn from the bit $b^3$ of needle $b^{11}$ and allow a slight movement of said needle in the carrier and independent of the movement of said carrier.

The movement of the jacks $h$ in the plate $g'$ is accomplished by the following preferred mechanism: Below the sinker-bed $e'$ and on the ring $e^4$, in which the web-holders $e^2$ are adapted to oscillate, is arranged a ring $h^5$, having a depending flange $h^6$ midway of its two peripheries. From the outer periphery to the base of the flange $h^6$ are arranged a series of radially-disposed vertical grooves $h^7$, and from the inner periphery to the base of flange $h^6$ are arranged a similar series of grooves $h^8$, which, however, are not cut on the same radial lines as are the grooves $h^7$, but are approximately midway between said grooves. The ring $h^5$ is adapted to oscillate slightly on the ring $e^4$, and to permit of the oscillation the ring $h^5$ is slotted, as at $h^9$, at various points in its periphery, and through these slots $h^9$ the supporting pins or screws $h^{10}$ are inserted and enter the ring $e^4$. It will thus be seen that the ring $h^5$ may be readily turned the length of a slot $h^9$ in either direction on ring $e^4$. The length of slot $h^9$ corresponds to half the distance between any two grooves $h^7$ or $h^8$, so that when the ring $h^5$ is turned to one end of the slot the grooves $h^7$ will occupy the same relative position as was occupied by grooves $h^8$ when the ring $h^5$ had been turned so that the pins $h^{10}$ rested on the opposite ends of the slots $h^9$.

Referring now to Fig. 5, it will be seen that the ring $h^5$ has been turned so that the series of slots $h^7$ are in direct alinement with the outer projection $h^3$ of the jacks $h$ and that the unslotted portions of the inner periphery of the ring $h^5$ are in alinement with the other prongs $h^4$ of said jacks $h$. When now the needle-carrier $d'$ is raised in the operation of the machine, the ring $h^5$ will strike against the inner prong $h^4$ of the jacks $h$, and thereby force all of said jacks $h$ inward to lock the bits $b^3$ of needles $b^{11}$ to the carrier $d'$. If, however, the ring $h^4$ is turned in the opposite direction, then the slots $h^8$ are in alinement with the inner prongs $h^4$ and the unslotted portion of the outer periphery of the ring $h^5$ is in alinement with the outer prongs $h^3$ of jacks $h$. When now the carrier $d'$ is raised, the ring $h^5$ will shift all the jacks $h$ outward to release the bits $b^3$ of needles $b^{11}$ from the carrier $d'$ sufficiently to allow them to play in a space formed between the under face of plate $g'$ and the upper face of a projection $d^2$ of carrier $d'$. This play of the bits $b^2$, as will be hereinafter more particularly described, permits of the formation of those meshes $f'$ which constitute the open or lacework of the fabric.

The oscillation of the ring $h^5$ is accomplished by the following preferred mechanism: Referring to Figs. 1, 3, and 4, the ring $h^5$ carries a pin or shaft $m$, projecting radially from its outer periphery. This pin $m$ at its free end enters a fork or clutch $m'$, secured to and projecting upward from an arm $m^2$. The arm $m^2$ is carried by a vertically-disposed rock-shaft $m^3$, suitably inclosed in a tubular bearing $m^4$, supported by the framework of the machine. On the lower end of the shaft $m^3$ is secured a rock-arm $m^5$, having a forked end $m^6$, inclosing the two faces of a ratchet pattern-wheel $m^7$. This wheel $m^7$ is provided on its respective faces with a series of removable buttons $m^8$, adapted as the wheel $m^7$ is turned to impinge against one side or the other of forks $m^6$ and to thereby shift said fork $m^6$ and rock-arm $m^5$ in alternate directions. The movement of rock-arm $m^5$ thus obtained is transmitted through shaft $m^3$ to the arm $m^2$ and the fork $m'$, and said fork $m'$ will shift the pin $m$ correspondingly. The ring $h^5$ will thus respond to the direct movement of pin $m$, which movement is controlled by the pattern-wheel $m^7$. The ratchet pattern-wheel $m^7$ is advanced step by step by means of a pawl $n$, the movement of the pawl being preferably controlled by the up-and-down movement of the needle-carrier $d'$. This is accomplished by securing to the needle-carrier $d'$ a bar or pin $n'$, adapted as the needle-carrier $d'$ descends to impinge upon and depress the free end of a lever $n^2$, the other end of said lever $n^2$ being secured to a rock-shaft $n^3$. This rock-shaft $n^3$ has a rock-arm $n^4$, to which the pawl $n$ is secured. The rock-arm $n^4$ is under the tension of a spring $n^5$, which normally tends to retract the arm $n^4$ and pawl $n$ and to elevate the lever $n^2$ when the carrier $d'$ rises. If desired, and in the fabrication of a stocking it may become necessary, the pawl $n$ may be wholly withdrawn from the notches or teeth of the ratchet-wheel $m^7$, as follows: The pawl $n$ carries a pin $o$, beneath which rests a hook $o'$. The hook $o'$ is adapted to be raised by causing a lever $o^2$, carrying said hook, to be oscillated, and for this purpose the lever at one end is pivoted to a rock-arm $o^3$, adapted to be operated by the shifting of a bar or rod $o^4$.

The play of the bits $b^3$ of needles $b^{11}$ in the carrier $d'$ may be regulated by removably securing to the under face of the plate $g'$ a ring $p$ of prescribed thickness.

The formation of the fabric is illustrated diagrammatically in Figs. 10, 11, and 12. In Fig. 10 the needles $b'$ are shown in full lines as having been fully depressed by their needle-carrier, and hence the meshes $f$ are all regularly formed. The needles $b^{11}$, however, are not fully depressed for the reason that their bits being free in the carrier the beards of said needles $b^{11}$ will extend above the beards of the other needles $b'$ a distance corresponding to the extent of play of the bits in the carrier. Now in the formation of the fabric illustrated in the drawings the bits of the needles $b^{11}$ are supposed to have this play for three successive operations of the carrier, and hence these needles $b^{11}$, as shown, retain a previously-formed loop $f^3$ and three elongated or crossing loops $f^4$. At the next operation of the needle-carrier, as shown in Fig. 11, all the needles $b^{11}$, as well as $b'$, are locked to the carrier, and hence the needles $b^{11}$ will form a new loop $f^5$ and will be depressed sufficiently to cast off the previously-formed loop $f^3$ and the crossing-loops $f^4$. In Fig. 12 the needles $b^{11}$ being still locked to the carrier a second new loop $f^6$ is formed by said needles, the completed fabric at the openwork part thus consisting, as originally designed, of sections $f$ of regularly-formed loops joined by other sections $f'$, which consist of three crossing-loops $f^4$, held between the loop $f^3$ and the two loops $f^5$ and $f^6$.

It will be readily understood that the particular pattern of fabric illustrated may be varied at pleasure in two ways—namely, first, by means of variations in the location of the buttons in the pattern-wheel $m^7$, which will control the number of crossing-loops $f^4$, as well as the alternation of said crossing-loops with the other loops $f^3$, $f^5$, and $f^6$, and, second, by the relative arrangement of the needles $b^{11}$ with respect to the needles $b'$ in the needle-cylinder $a$.

Having thus described the nature and object of my invention, what I claim as new, and desire to secure by Letters Patent, is—

1. In a circular-knitting machine of the character described, a series of regular needles, divided into two sets, a carrier, means for reciprocating said carrier to operate both sets of needles, a locking mechanism for each needle of one set carried by said carrier and adapted to radially traverse the same to lock or release each needle of said set in the carrier, and means for operating said mechanism, substantially as and for the purposes described.

2. In a circular-knitting machine of the character described, a series of regular needles, divided into two sets, a carrier means for vertically moving said carrier to operate both sets of needles, a series of jacks adapted to be shifted in and out of said carrier to lock or release one set of needles to the carrier and means for operating said jacks, substantially as and for the purposes described.

3. In a circular-knitting machine of the character described, a series of needles divided into two sets, a carrier adapted to be elevated and depressed to thereby operate both sets of needles, a series of removable jacks adapted to permanently lock one set of needles in the carrier, and a series of movable jacks adapted to be shifted in said carrier to lock or release the other set of needles in said carrier, substantially as and for the purposes described.

4. In a circular-knitting machine of the character described, a series of needles divided into two sets, a carrier adapted to operate both sets of needles, a series of jacks adapted to permanently lock one set of needles in said carrier, a second series of jacks each provided with two upwardly-projecting prongs and adapted to slide in and out in the needle-carrier to lock or release the other set of needles in said carrier and an oscillating ring adapted to impinge alternately upon either of the prongs of said jacks and to thereby shift said jacks in or out in the carrier when said carrier is operated in one direction, substantially as and for the purposes described.

5. In a circular-knitting machine of the character described, a needle-carrier, means for moving said carrier up and down in a vertical direction, a set of needles adapted to be locked or released in said carrier and when released to have a vertical play in said carrier independent of the vertical movement of said carrier, means for locking or releasing said needles, and mechanism operated by the carrier for controlling said means, substantially as and for the purposes described.

6. In a circular-knitting machine of the character described, a needle-carrier, a set of needles adapted to be locked or released in said carrier and when released to have a vertical play in said carrier independent of the vertical movement of said carrier, a series of jacks, each provided with two upwardly-extending prongs and adapted to slide in and out in said carrier to lock or release the needles in the carrier, an oscillating ring adapted to enter between the prongs of the jacks when the carrier is operated in one direction and means controlled by the carrier for oscillating said ring to cause said ring to impinge upon either of said prongs and thereby shift the jacks in or out in said carrier, substantially as and for the purposes described.

7. In a circular-knitting machine of the character described, a needle-carrier, a grooved plate secured to the upper face of said carrier, a set of needles carried by said carrier, a series of jacks adapted to slide in the grooves of said plate to lock or release the needles in said carrier, means for operating said jacks and mechanism operated by the carrier for controlling said means, substantially as and for the purposes described.

8. In a circular-knitting machine of the character described, a ring having a downwardly-projecting flange, a series of radially-disposed grooves arranged along the inner periphery of said ring and terminating at the base of said flange, a similar series of grooves arranged along the outer periphery of said ring, the two series of grooves being arranged on different radial lines, substantially as and for the purposes described.

In testimony whereof I have hereunto set my signature in the presence of two subscribing witnesses.

ALFRED G. WRIGHT.

Witnesses:
J. WALTER DOUGLASS,
RICHARD C. MAXWELL.